United States Patent [19]
Leonard

[11] 3,739,102
[45] June 12, 1973

[54] TRANSMITTER RECEIVER FOR RADIO TELEPHONE NETWORK

[75] Inventor: Didier Leonard, Boulogne, France

[73] Assignee: Compagnie Industrielle Des Telecommunications Cit-Alcatel, Paris, France

[22] Filed: May 28, 1971

[21] Appl. No.: 148,078

[52] U.S. Cl. .................... 179/41 A, 325/51, 325/55
[51] Int. Cl. .............................................. H04q 7/04
[58] Field of Search .................... 179/41 A, 18 EA; 325/51, 53, 54, 55, 64, 4

[56] References Cited

UNITED STATES PATENTS

| | | | |
|---|---|---|---|
| 2,694,140 | 11/1954 | Gilman et al. | 325/51 |
| 2,521,696 | 9/1950 | DeArmond | 325/51 |
| 2,870,326 | 1/1959 | Sterner | 325/53 |
| 3,155,909 | 11/1964 | Shepherd | 325/51 |
| 3,118,018 | 1/1964 | Cornell et al. | 179/41 A |
| 3,539,924 | 11/1970 | Daskalakis et al. | 325/51 |
| 3,517,315 | 6/1970 | Malm | 179/41 A |
| 3,555,424 | 1/1971 | Malm | 325/55 |

*Primary Examiner*—Kathleen H. Claffy
*Assistant Examiner*—Thomas L. Kunder
*Attorney*—Craig, Antonelli & Hill

[57] ABSTRACT

Device ensuring the selection of a fixed connection extension located so as to provide a good quality connection exclusive of other fixed extensions which are not so favorably located. The intended application is the connection between a mobile extension and a fixed extension supplied by the said connection extension.

9 Claims, 2 Drawing Figures

INVENTOR

DIDIER LEONARD

BY Craig, Antonelli & Hill

ATTORNEYS

INVENTOR

DIDIER LEONARD

BY Craig, Antonelli & Hill

ATTORNEYS

TRANSMITTER RECEIVER FOR RADIO TELEPHONE NETWORK

Figure 1:
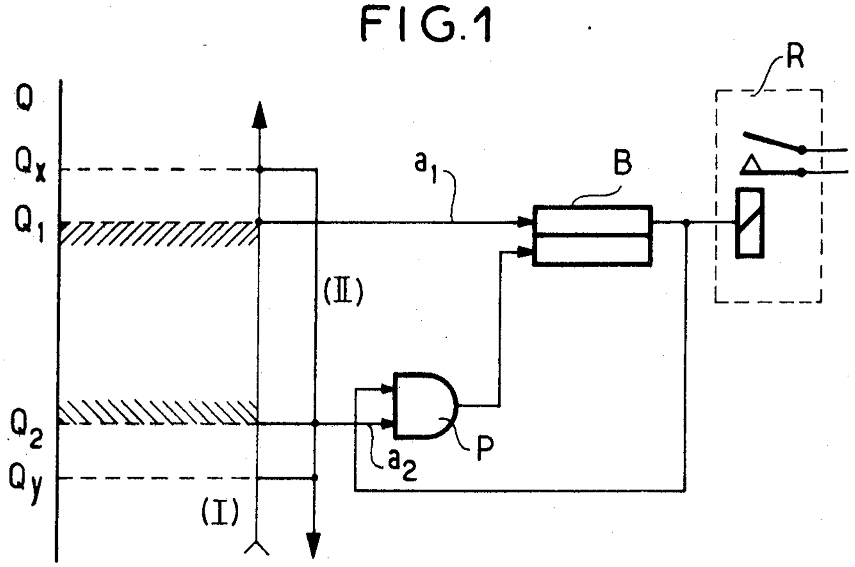

The present invention concerns a transmitter-receiver for a radio telephone network linked to a wired telephone network through apparatus including concentrators each arranged to broadcast a general call code over successive free channels of a set of channels, the general call code being identified by a transmitter-receiver of the network wishing to make a call as indicating an available channel. The present invention is more particularly concerned with a concentrator selection system for the transmitter-receiver.

Such apparatus including concentrators is described in my co-pending application, Ser. No. 12,576, filed Feb. 19, 1970 and now U.S. Pat. No. 3,692,952 the contents of which are hereby inserted by way of reference.

Each concentrator includes a number of transmitters, and free transmitters of the concentrator broadcast the general call code. When a radio-telephone wishes to communicate with a telephone of the wired network, setting up the communication begins with the transmitter-receiver decoding the general call code. The transmitter-receiver is linked to the concentrator, as a first step in the communication between the transmitter-receiver and the wired telephone he is calling.

As soon as one particular concentrator is taken up in this way, the general call code is taken up by another free transmitter.

In simple systems, where the radio-telephone network is relatively small, a single concentrator suffices for setting up all communications. Where the radio-telephone network covers a large area, however, there will generally be provided several concentrators for setting up the various communications. In this case, it is advantageous that a mobile radio-telephone wishing to communicate or communicating with a subscriber to the wired telephone network does so through a favorable concentrator.

In general, when a transmitter-receiver is seeking a general call code to locate an available channel, the first code received will not be that of the most favorably situated concentrator. Two disadvantages result: on the one hand, the transmitter-receiver will be given a link of possibly poor quality; on the other hand, it will unnecessarily occupy a channel which could be better used by a transmitter-receiver closer to the concentrator concerned.

Furthermore, having initially selected the most favorable concentrator, it is possible that the transmitter-receiver moves to such a position that a different concentrator would be more advantageous.

In accordance with the present invention, there is provided a transmitter-receiver for a radio-telephone network linked to a wired telephone network through apparatus including concentrators each arranged to broadcast a general call code over successive free channels of a set of channels, the general call code being identified by a transmitter-receiver of the network wishing to make a call as indicating an available channel, the transmitter-receiver including a concentrator selection system comprising comparator circuitry connected to compare successively received general call codes for an initially selected concentrator and arranged to respond to non-coincidence of a preselected number of such codes by initiating one or more further concentrator selection cycles, until such time as coincidence is obtained, when the corresponding general call code is memorized to select the concentrator concerned.

The transmitter-receiver is thus provided with means for selecting a concentrator providing a communication quality greater than a predetermined minimum level; to control the quality of the communication once it has been set up; and to select a concentrator providing better quality communication should the quality provided by an initially selected concentrator deteriorate to an unacceptable level.

The selection or inscription of a concentrator involves two operations; firstly, the radio-telephone memorizes the general call code of the selected concentrator; secondly, the radio-telephone informs the concentrator that it has been selected by transmitting to it its own call number.

It is important that these operations are carried out automatically, without requiring intervention of an operator. It is also important that the operations of selection and monitoring are carried out without increasing saturation of the radio network, given that the radio-telephone can carry out inscription, monitoring and re-inscription operations. It is also important that the wired network be informed of a change in the concentrator employed in a link, supposing that the wired network is capable of carrying out inscription and re-inscription operations when a change takes place, the number of the radio-telephone being erased in the previously employed concentrator.

The over-all operation of the system will now be briefly described, so that the following detailed description of the invention will be more readily understood.

Each radio-telephone includes a frequency exploration device operating in steps. It systematically explores the band of available carrier frequencies until a free channel is located, in the case of a call to a mobile radio-telephone, or a channel carrying the general call code from a concentrator is located, in the case of a call made to a subscriber on the wired telephone network. Each channel frequency is explored for a time sufficient for several decodings of the general call code, five decodings, for example.

Each time the frequency exploration device moves forward by one step, an advance pulse, referred to later as pulses J, is emitted.

Each general call code starts with a characteristic bit or sequence of bits referred to as the initial bit or bits. These are generally longer than the information bits of the code.

The mobile radio-telephone operates in two modes:

On stand-by, it effects a continuation exploration of the frequency spectrum of the channels, effects inscription of a concentrator, monitors such an inscription, or changes inscription.

While occupied with a communication with a subscriber of the wired network, the exploration is halted. This halts the production of the pulses J.

The concentrator selection system imposes a relatively severe quality criterion on the choice of concentrator. The best concentrator available is not called for, it being sufficient for a selected concentrator to provide a quality greater than the minimum acceptable quality. Once this minimal quality has been obtained, there is little point in seeking improved quality, as the advantage to be obtained is negligible.

A time factor is involved in the abandonment of an initially selected concentrator and the selection of a new concentrator. A decreased quality may be due to a number of causes, falling into two categories. In the first category the reduction in quality is permanent, and this may arise, for example, if the radio-telephone moves beyond the range of the initially selected concentrator.

A temporary loss in quality may be obtained by a fading or masking effect, for example, if a vehicle carrying the radio-telephone passes through a tunnel, under a bridge, and so on.

In the second case it is advantageous to retain an initially selected concentrator for a minimum period after loss of quality, so that if the loss does not exceed a predetermined duration, 40 seconds, for example, the same concentrator is retained.

This time lag must be continuous, in that if adequate quality is restored before the end of the 40 seconds, the cycle must be restarted so that the next quality loss will also have the benefit of 40 seconds time lag.

This time factor has two advantages. Firstly, it corresponds to the physical reality of a transient disturbance, and it also permits the same circuits to be used for controlling inscription of a concentrator and the abandonment of that concentrator and the inscription of a further one. This permits a simplification of the apparatus.

Figure 2:
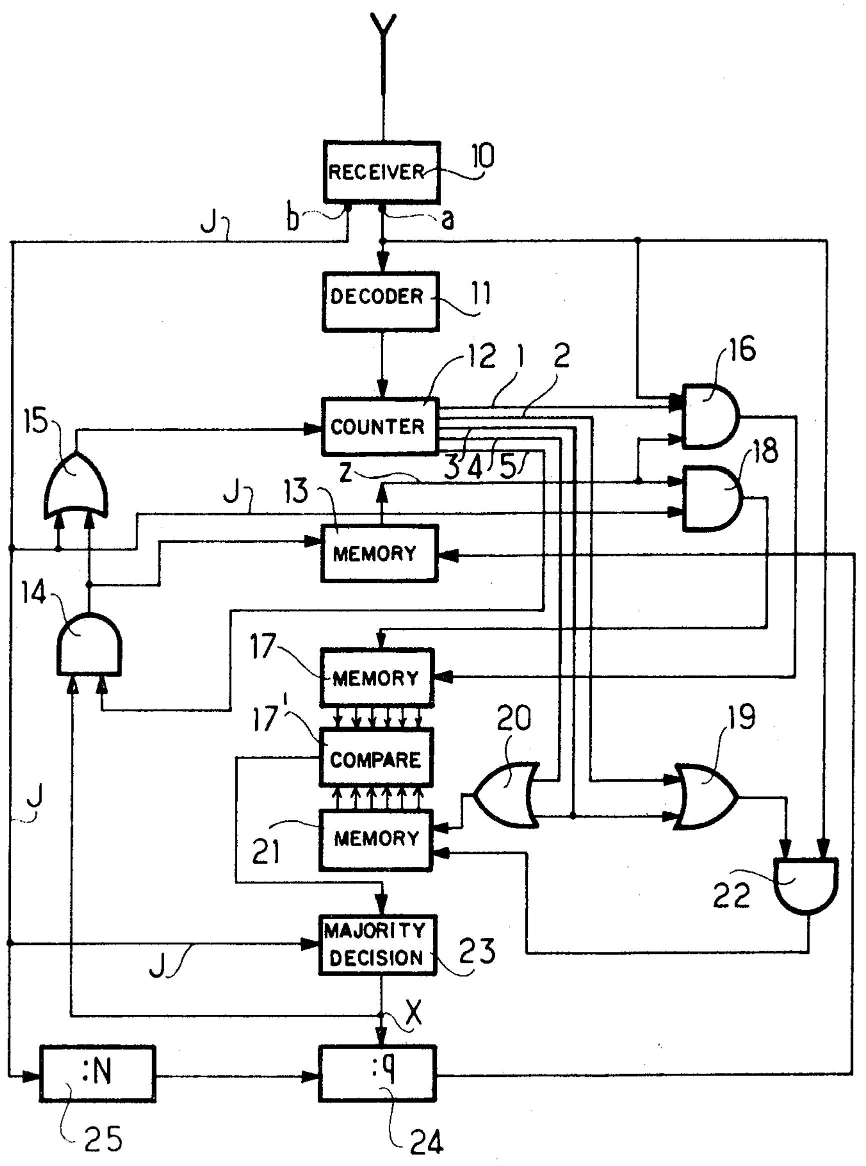

This invention will now be described in more detail, by way of example only, with reference to the accompanying diagramatic drawings, in which:

FIG. 1 is a simplified block diagram showing the principle of the invention; and FIG. 2 is a block diagram of a transmitter-receiver to which the invention has been applied.

Referring to FIG. 1, the vertical line at the left-hand side of the figure is an axis of quality (Q), in arbitrary units. The quality is that of a radio-telephone to wired telephone link. Quality increases upwardly along this axis, as seen in the figure.

Each link is set up through one of a set of concentrators, and for a link to be set up the quality of it must be greater than a first limit $Q_1$. Once a link has been selected, it will be broken if the quality deteriorates to such an extent that it becomes less than a second limit $Q_2$. Thus, for example, an initial quality $Q_x$ provides a satisfactory link, but should it fall to quality $Q_y$, the link will be broken.

A relay R is shown as an inscription element, being energized to select a corresponding concentrator.

If the quality exceeds $Q_1$, then a signal $a_1$ of logic value "1" is applied to an input of a bistable element B. This sets the bistable element output to logic "1" and energizes the relay R. At the same time, the logic "1" from the output of bistable B is applied to one input of an AND gate P.

Should the quality fall below limit $Q_2$, then a signal $a_2$ of logic value "1" is applied to a second input of gate P, whose output consequently applies a logic "1" to the second input of bistable B. The bistable switches over to de-energize the relay R. The concentrator is disengaged and the corresponding link broken.

Referring to FIG. 2, a transmitter-receiver for a radio-telephone network linked to a wired telephone network includes a receiver 10; on a first output *a*, the receiver 10 provides a general call code, broadcast by a concentrator providing the radio-telephone to wired telephone link. At a second output *b* of the receiver 10 there are provided advance pulses J each signifying a channel change in the course of a selection operation. These pulses are locally generated at a frequency such that *n* general call codes can be decoded on each channel. For example, if *n* is equal to five and each general call code requires 20 milliseconds for decoding, one pulse J is provided every 100 milliseconds.

Each general call code is preceded by one or more initial pulses, which may be longer than the information pulses to facilitate identification. The initial pulses are decoded in an initial pulse decoder 11. The output of decoder 11 is applied to the input of an inscription counter 12 whose capacity is *n*, five in the present example. The counter 12 has five outputs labelled 1 to 5, each energized during the corresponding counter state.

An inscription order memory 13 provides an output signal Z with the logic value "1" when a concentrator inscription is removed. While a particular concentrator is inscribed, the value of signal Z is logic "0."

A first general call code memory 17 is connectable to receive each general call code. This memory 17 is suitably in the form of a shift register receiving successive bits of the code. A second general call code memory 21 is also connectable to receive the general call code, and is also suitably in the form of a shift register.

A comparator circuit 17' is connected to compare the contents of memories 17 and 21. Its output is connected to the input of a majority circuit 23, in the present example a counter connected to receive pulses significant of coincidences between the contents of memories 17 and 21. The counter 23 has a capacity of two.

The advance pulses J are applied to a counter-divider 25 which divides by N, the number of channels, for example, 25. The output of counter-divider 25 is connected to the input of a further counter-divider 24 which divides by *q*, defined as follows:

A concentrator inscription is abandoned if the corresponding general call code is not correctly decoded during *q* successive expiration.

If incorrect decoding is obtained less than *q* times in succession, the count in counter-divider 24 is restarted from zero as soon as a correctly decoded general call code is obtained.

An AND gate 14 has first and second inputs connected respectively to the output 5 of the inscription counter 12 and the output X of the majority circuit 23. Its output is connected to an input of the memory 13, and also to one input of an OR gate 15 whose second input is connected to receive the advance pulses J. The output of gate 15 is connected to a return-to-zero input of the inscription counter 12.

An AND gate 16 has one input connected to output *a* of the receiver 10. A second input in connection to output 1 of the inscription counter 12, and a third input is connected to receive the signal Z from memory 13. Its output is connected to an input of the memory 17.

An AND gate 18 receives the advance pulses J on one input and the signal Z on a second input. Its output is connected to a return-to-zero input of memory 17.

An OR gate 19 has first and second inputs connected respectively to outputs 2 and 3 of the inscription counter 12. Its output is connected to one input of an AND gate 22 whose second input is connected to output *a* of receiver 10. The output of gate 22 is connected to the input of memory 21.

An OR gate 20 has first and second inputs respectively connected to outputs 3 and 4 of the inscription counter 12. Its output is connected to a second input of memory 21.

The inscription order memory 13 is set to state 1 on energizing the transmitter-receiver. It is reset to state 0 by the output of gate 14.

The majority circuit 23 has a return-to-zero input connected to receive the advance pulses J.

Divider-counter 24 is reset to zero by the output of majority circuit 23.

The system operates as follows:

On energizing the transmitter-receiver, the inscription order memory 13 passes to state 1. The first advance pulse J sets the inscription counter 12 to 0, with the majority circuit 23.

In a concentrator selection and inscription operation, the first general call code will generally be lost, as the initial bit or bits are unlikely to be received, reception commencing in the middle of a code. The first fully received general call code is memorized. The next is compared with the first, and the following is once again compared for confirmation. Only the initial bit or bits of the following call code are used.

On receiving the first initial bit from its decoder 11, counter 12 passes to state 1, opening gate 16 to allow the code, identifying the concentrator concerned, to enter memory 17.

When the initial bit of the next general call code appears from decoder 11, counter 12 passes to state 2, gate 16 is closed, and gate 22 opens. The second code is entered in memory 21.

State 3 of counter 12, corresponding to the initial bit of a third general call code, initiates a comparison in comparative circuit 17'. If coincidence is observed, the majority circuit 23 passes to state 1.

State 4 of counter 12, corresponding to the initial bit of a fourth general call code, orders a second comparison to confirm that coincidence is obtained. If coincidence between the contents of memory 17 and 21 is still obtained, majority circuit 23 passes to state 2.

This coincides with state 5 of counter 12, opening gate 14 to erase the content of inscription order memory 13.

The transmitter-receiver is thus linked to a concentrator whose code is inscribed in memory 17. This concentrator has only been selected because three successive general call codes were not unduly deteriorated by noise.

In effect, initial memorization of the concentrator code is followed by two verifications. This involves a third order redundancy which can only be obtained if the signal-to-noise ratio of the link established exceeds a minimum value, so as to provide a link of acceptable quality.

If the signal-to-noise ratio does not exceed the minimum required, the general call codes are received with random errors produced by noise, and the third order redundance is not obtained. In this case, the concentrator could give a poor quality link, and is not selected.

It will be appreciated that in varying the order of the redundancy required, it is possible to impose increasing standards of quality on the link obtained. This is done by increasing the number of call code coincidences to be detected.

Each time the majority circuit 23 records two such coincidences, indicating that three successive call codes have been correctly received, counter 24 is reset to zero by the output signal at output X of the majority circuit 23.

If after $q$ successive complete sweeps the required increase majority of $p$ correct decodings in $n$ is not obtained, the concentrator concerned is considered as definitively inappropriate. The number of unsuccessful sweeps taken as critical may be, for example, 16. This number allows for possible masking or fading effects which the selected concentrator may experience, for example, due to movements of the transmitter-receiver.

Counter 24 receives one impulse J in N, through counter-divider 25. When the transmitter-receiver is engaged in a communication, there is no more frequency sweep for locating a free channel, and therefore no further advance pulses J. Consequently, the inscription of the selected concentrator is maintained.

Values of the various parameters referred to in the preceding description will now be given by way of example, to give an idea of the way in which the process evolves in time.

$n$, the number of general call codes transmitted in succession is five;

$p$, the number of repetitions of the general call code required by the majority circuit 23 after an initial reception of the code is equal to two; the treatment on each channel lasts 100 milliseconds, the duration of five general call codes;

N, the number of channels available, is 25;

$q = 16$, as just described; the total duration of a frequency exploration cycle is 25 times 100 milliseconds, that is, 2.5 seconds; the time interval at the end of which inscription of a concentrator is definitively abandoned is $q$ times 2.5 seconds, that is, 40 seconds.

The effect of a brief masking or fading is ignored if it lasts less than 40 seconds, since as soon as the correct code is received, the transmitter-receiver is again credited with a new possibility for suppression of the signal during 40 seconds.

What we claim is:

1. A transmitter-receiver for a radio-telephone network linked to a wired telephone network through apparatus including concentrators each arranged to broadcast a general call code over successive free channels of a set of channels, the general call code being identified by a transmitter-receiver of the network wishing to make a call as indicating an available channel, the transmitter-receiver including a concentrator selection system comprising comparator means for comparing successively received general call codes for an initially selected concentrator, first means responsive to non-coincidence of a preselected sequential number of such codes for initiating at least one further concentrator selection cycle, until such time as coincidence is obtained, and second means for storing the corresponding call code only in response to repeated coincidence of sequentially received codes to select the concentrator concerned.

2. A transmitter-receiver as claimed in claim 1, in which said comparator means includes a first memory connected to receive and hold a first-received general call code, a second memory connected to receive and hold one at a time a predetermined number of succeeding general call codes, coincidence circuit means connected to said first and second memories for indicating coincidence of the contents of the first and second memories, and a majority decision circuit connected to the output of said coincidence circuit means to count such coincidences and indicate when a predetermined number of coincidences has been detected.

3. A transmitter-receiver as claimed in claim 1, wherein said first means, includes a circuit providing an advance pulse each time a change in channel occurs, these pulses being applied to the input of a divider for dividing said advance pulse by N, where N is the number of channels, the output of said divider being connected to the input of a second divider which divides the divider outputs by a division factor $q$, the output of said second divider being connected to circuitry which is held in a first state to permit adoption of an initially selected concentrator and which is switched to a second state by the output of said divider, so that if the predetermined number of coincidences is not obtained after $q$ sweeps of the N channels, the initially selected concentrator is discarded, said second divider being reset to zero by said majority decision circuit when the predetermined number of coincidences is obtained.

4. A transmitter-receiver as claimed in claim 1, wherein said comparator means includes sequence control means responsive to sequentially received general call codes for storing and repetitively comparing said codes with each other.

5. A transmitter-receiver as claimed in claim 4, in which said comparator means includes a first memory connected to receive and hold a first-received general call code, a second memory connected to receive and hold one at a time a predetermined number of succeeding general call codes, coincidence circuit means connected to said first and second memories for indicating coincidence of the contents of the first and second memories, and a majority decision circuit connected to the output of said coincidence circuit means to count such coincidences and indicate when a predetermined number of coincidences has been detected.

6. A transmitter-receiver as claimed in claim 5, wherein said first means, includes a circuit providing an advance pulse each time a change in channel occurs, these pulses being applied to the input of a divider for dividing said advance pulse by N, where N is the number of channels, the output of said divider being connected to the input of a second divider which divides the divider outputs by a division factor $q$, the output of said second divider being connected to circuitry which is held in a first state to permit adoption of an initially selected concentrator and which is switched to a second state by the output of said divider, so that if the predetermined number of coincidences is not obtained after $q$ sweeps of the N channels, the initially selected concentrator is discarded, said second divider being reset to zero by said majority decision circuit when the predetermined number of coincidences is obtained.

7. A transmitter-receiver as claimed in claim 3, in which said comparator means includes a first memory connected to receive and hold a first-received general call code, a second memory connected to receive and hold one at a time a predetermined number of succeeding general call codes, coincidence circuit means connected to said first and second memories for indicating coincidence of the contents of the first and second memories, and a majority decision circuit connected to the output of said coincidence circuit means to count such coincidences and indicate when a predetermined number of coincidences has been detected.

8. A transmitter-receiver as claimed in claim 1, wherein said comparator means includes first and second memories, a comparator connected to said first and second memories for comparing the contents thereof, and sequence control means responsive to sequentially received general call codes for storing a first received code in said first memory and subsequently received codes sequentially in said second memory, the output of said comparator indicating the coincidence between the codes stored in said memories.

9. A transmitter-receiver as claimed in claim 8, wherein said first means, includes a circuit providing an advance pulse each time a change in channel occurs, these pulses being applied to the input of a divider for dividing said advance pulse by N, where N is the number of channels, the output of said divider being connected to the input of a second divider which divides the divider outputs by a division factor $q$, the output of said second divider being connected to circuitry which is held in a first state to permit adoption of an initially selected concentrator and which is switched to a second state by the output of said divider, so that if the predetermined number of coincidences is not obtained after $q$ sweeps of the N channels, the initially selected concentrator is discarded, said second divider being reset to zero by said majority decision circuit when the predetermined number of coincidences is obtained.

* * * * *

UNITED STATES PATENT OFFICE

CERTIFICATE OF CORRECTION

Patent No. 3,739,102 Dated June 12, 1973

Inventor(s) Didier Leonard

It is certified that error appears in the above-identified patent and that said Letters Patent are hereby corrected as shown below:

Priority data omitted. Should read:

--7019604 France May 28, 1970--

Signed and sealed this 5th day of March 1974.

(SEAL)
Attest:

EDWARD M.FLETCHER,JR.
Attesting Officer

C. MARSHALL DANN
Commissioner of Patents